A. GOLDSMITH.
NUTCRACKER.
APPLICATION FILED AUG. 31, 1915.
1,202,830.    Patented Oct. 31, 1916.
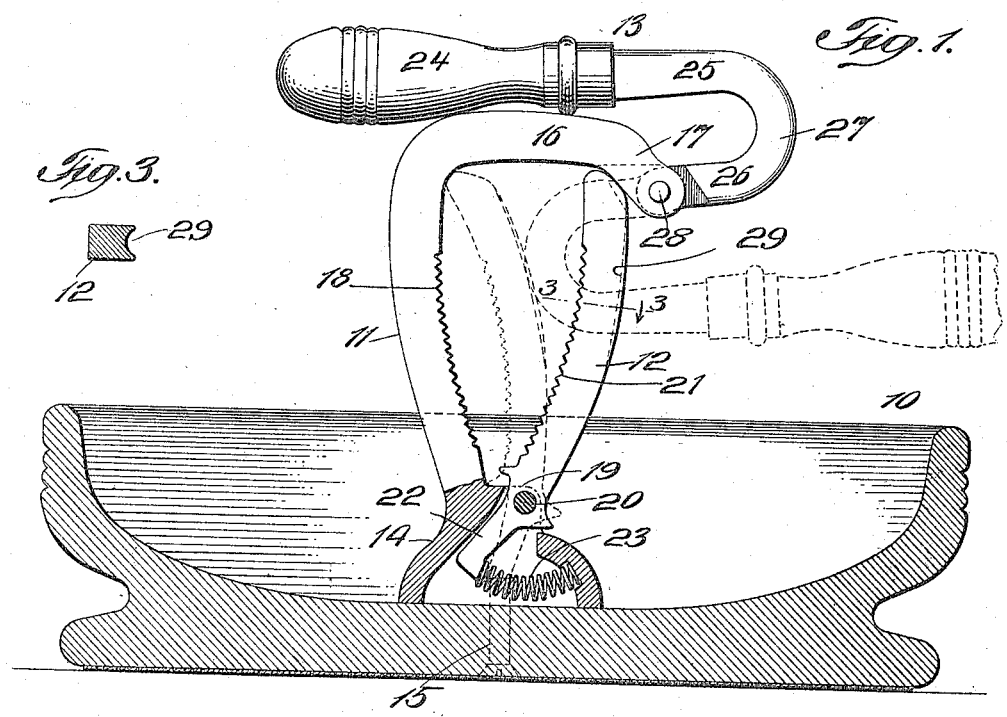
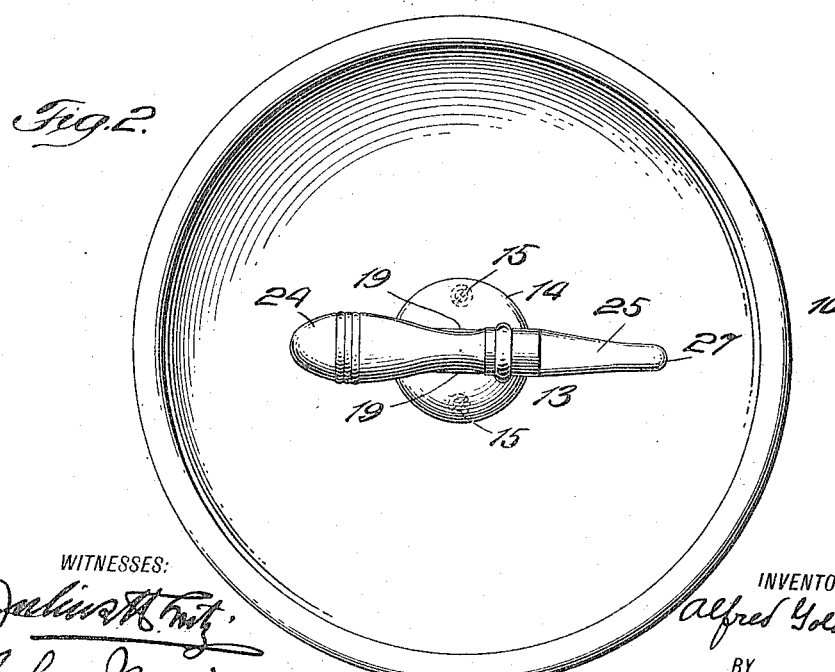
WITNESSES:
INVENTOR
Alfred Goldsmith
BY
ATTORNEY

UNITED STATES PATENT OFFICE.

ALFRED GOLDSMITH, OF NEW YORK, N. Y., ASSIGNOR TO L. D. BLOCH & COMPANY, OF NEW YORK, N. Y., A CORPORATION OF NEW YORK.

NUTCRACKER.

1,202,830. Specification of Letters Patent. Patented Oct. 31, 1916.

Application filed August 31, 1915. Serial No. 48,160.

*To all whom it may concern:*

Be it known that I, ALFRED GOLDSMITH, a citizen of the United States, and a resident of New York, in the county of New York and State of New York, have invented certain new and useful Improvements in Nutcrackers, of which the following is a specification.

The invention pertains more particularly to nut bowls made of wood and containing therein novel means for cracking the shells of edible nuts, these means being rigidly connected with the bowl and obviating the presence of an anvil and separate hammer for cracking the shells of the nuts.

My invention comprises a suitable bowl preferably made of wood adapted to contain the nuts, and means whereby the user of the bowl may conveniently crack the nuts within the bowl, said means being secured to the bowl itself and comprising a jaw serving as an anvil, a movable jaw between which and the anvil-jaw the nuts may one after another be placed, and a manually operative lever whereby the movable jaw may be moved toward the anvil-jaw and by forcing the nut against the same crack the shell thereof. The anvil-jaw is permanently secured to the bowl at about the center thereof, the movable jaw is pivotally secured to the lower portion of said anvil-jaw and has a spring tension outwardly therefrom and the operative power lever is pivotally secured to the rigid anvil-jaw and adapted when manually operated, to press the movable jaw against the nut placed between the anvil-jaw and said movable jaw and crack the shell of said nut.

My purpose is to provide a wooden bowl having secured at the center thereof suitable means all self-contained and carried by the bowl whereby without inconvenience nuts within the bowl placed one after another between the operative parts of said means may have their shells cracked or broken so that both shells and contents thereof may be caught within the bowl; and another purpose of my invention is to provide rigid means against which the nuts to be cracked may be pressed by the manually operative lever and the pivoted jaw, which has an outward normal spring tension from said rigid means, but is retained by a portion of said means in correct position to be acted upon by the manually operative lever.

The invention will be fully understood from the detailed description hereinafter presented, reference being had to the accompanying drawings, in which—

Figure 1 is a central vertical section through a nut-bowl equipped with nut-cracking means embodying my invention, the nut-cracking means being shown in normal position by full lines and in operated position by dotted lines; Fig. 2 is a top view of the same, and Fig. 3 is a cross-section through the movable jaw of the nut-cracking means, taken on the dotted line 3—3, Fig. 1.

In the drawings, 10 designates the bowl, preferably formed of wood and of ornamental appearance, 11 the rigid or anvil-jaw of the nut-cracking means, 12 the movable jaw and 13 the manually operative lever by means of which the movable jaw may be moved from its normal position, shown by solid lines in Fig. 1, to its operated position indicated by dotted lines in Fig. 1.

The bowl 10 is commodious so as to hold a suitable quantity of nuts, but being of wood is reasonably light and may be given sufficient thickness in its bottom portion to properly sustain the nut-cracking means and permit of the adequate and convenient operation of the same.

The rigid jaw 11 is formed of metal and integral with a metal base 14 seated within and upon the central portion of the bowl and thereto fastened by means of screws 15 which extend upwardly through the bottom of the bowl and enter said base 14. The jaw 11 bows upwardly and outwardly from the base 14 and then turns inwardly in a lateral direction above the base 14 and thence downwardly, thereby forming a top member 16 and a downwardly projecting arm 17. The jaw 11 will preferably have a serrated inner edge, as at 18, thereby the more effectually to grip and aid in cracking the nut.

The movable jaw 12 is pivotally secured to the base-portion 14 between two parallel flanges 19 thereof, projecting above the body of the base-portion 14 and receiving the lower portion of the movable jaw and the pin 20 by which said jaw is pivotally secured in place. The body portion of the jaw 12 bows outwardly and upwardly and substantially corresponds with that portion of the jaw 11 between the base 14 and member 16, and the inner edge of the jaw 12 is serrated, as at 21. The upper end of the jaw 12 is below the upper member 16, and normally abuts against the inner edge of the downwardly extending portion or arm 17 of said member 16. The arm 17 operates as a stop for the upper end of the jaw 12 and arrests said jaw in its normal position without interfering with the jaw being turned to its operated position. On the lower end of the jaw 12 is formed an arm 22, which extends downwardly into a chamber formed on the base 14 and is engaged by a coiled spring 23 confined within said chamber and bearing at one end against the wall thereof and at its other end against the arm 22. The spring 23 exerts a tension against the arm 22 for holding the jaw 12 in its normal position against the stop arm 17, and said spring 23 becomes compressed when the jaw 12 is turned toward the jaw 11 or to the position indicated by dotted lines. The spring 23 is desirable because it prevents any loose rattling of the jaw 12 which would take place if the spring were omitted and the jaw allowed to take its own position with relation to the jaw 11.

The manually operative lever 13 has on its outer end a suitable handle 24 and the body portion of said lever is bent into U-shape, forming arms 25, 26 and connecting bend 27 which has a rounded outer edge. The arm 26 is secured by a pivot 28 in the lower end of the stop-arm 17. The lever 13 is shown by solid lines in Fig. 1 in its normal position and by dotted lines in its operated position. When the bowl is not in use the lever 13 will extend along and rest upon the upper member 16 connected with the rigid jaw and when in this position will be out of the way and afford a neat appearance symmetrical with the other features of the device. When it is desired to crack a nut, the nut will be placed between the jaws 11, 12 and the lever 13 will then be manually turned from over the member 16 so that its bend 27 may be carried against the movable jaw 12 and force said jaw inwardly against the nut and toward the fixed jaw 11, as will be understood by the dotted position of the lever 13 shown in Fig. 1. The upper outer edge of the movable jaw 12 is formed with a vertical groove 29 (Fig. 3) into which the outer rounded edge of the bend 27 of the lever 13 moves during the operation of forcing the jaw 12 inwardly, said groove 29 serving to aid in keeping the said lever and jaw in proper alinement during the operation of cracking a nut. After the nut has been cracked, the lever 13 may be released and if released suddenly the spring 23, acting against the jaw 12, will throw said lever back to its normal position, shown by solid lines in Fig. 1. If the user of the device should retain the lever 13 under control while permitting the jaw 12 to return to its normal position, the handle portion 24 of the lever would stand vertically and in that event the user would turn the handle 24 over upon the member 16 so as to restore the mechanism to its proper normal condition.

The handle 24 and bowl 10 will preferably be of the same color so as to harmonize with each other and thereby present an attractive article.

I have hereinbefore described the preferred arrangement of the several features constituting my invention, and in the vertical arrangement shown the member 16 connected with the fixed jaw serves as a bail or handle for use in lifting or carrying the bowl. I do not wish, however, to confine my invention in every instance to the arrangement of the jaws vertically, since they may be set at an angle to the horizontal plane of the bowl or, also, arranged to extend horizontally.

What I claim as my invention and desire to secure by Letters-Patent, is:

1. As a new article of manufacture, a support having secured thereto nut-cracking means comprising a base portion engaging the support, an upwardly and outwardly bowed rigid jaw extending from said base and having a top member extending laterally from the upper end thereof and then downwardly to form a depending arm, an oppositely bowed jaw pivotally secured at its lower portion adjacent to the lower end of said rigid jaw and at its upper end being confined at the inner side of said arm, a spring acting against said pivoted jaw to normally maintain the upper end of the same against said depending arm, and a manually operative lever pivotally secured at one end to said depending arm adjacent to said pivoted jaw and having on its other end a handle, said lever in its body portion being of approximately U-shape so that the handle may extend along and over said top member and the bend of the body portion be caused to engage said movable jaw when said handle is turned from over said top member and downwardly.

2. As a new article of manufacture, a support having secured thereto nut cracking means comprising a hollow base engaging the support, an upwardly extending and outwardly bowed rigid arm integral with said base and having a top member extending laterally from its upper end and above said base and then downwardly to form a depending arm, an oppositely bowed movable jaw pivotally secured at its lower portion to and having a part extending within said base, and said movable jaw at its upper end being confined at the inner side of said depending arm, a spring confined within said hollow base and engaging that portion of the pivoted jaw extending therein and serving to normally maintain said pivoted jaw in its outer position against said depending arm, and a manually operative lever pivotally secured at one end to said depending arm adjacent to said pivoted jaw and having on its other end a handle, said lever in its body portion being of approximately U-shape so that the handle may extend along and over said top member and the bend of the body portion be caused to engage said movable jaw when said handle is turned from over said top member and downwardly.

Signed at New York, in the county of New York, and State of New York, this 28th day of August A. D. 1915.

ALFRED GOLDSMITH.

Witnesses:
ARTHUR MARION,
CHAS. C. GILL.

Copies of this patent may be obtained for five cents each, by addressing the "Commissioner of Patents, Washington, D. C."